(12) United States Patent
Raichelgauz et al.

(10) Patent No.: US 9,191,626 B2
(45) Date of Patent: Nov. 17, 2015

(54) SYSTEM AND METHODS THEREOF FOR VISUAL ANALYSIS OF AN IMAGE ON A WEB-PAGE AND MATCHING AN ADVERTISEMENT THERETO

(71) Applicant: Cortica, Ltd., Tirat Carmel (IL)

(72) Inventors: Igal Raichelgauz, Herzelia (IL); Karina Odinaev, Haifa (IL); Yehoshua Y. Zeevi, Haifa (IL)

(73) Assignee: Cortica, Ltd., Tel Aviv (IL)

( * ) Notice: Subject to any disclaimer, the term of this patent is extended or adjusted under 35 U.S.C. 154(b) by 135 days.

(21) Appl. No.: 13/624,397

(22) Filed: Sep. 21, 2012

(65) Prior Publication Data

US 2013/0018736 A1    Jan. 17, 2013

Related U.S. Application Data

(63) Continuation-in-part of application No. 13/344,400, filed on Jan. 5, 2012, now Pat. No. 8,959,037, which is a continuation of application No. 12/434,221, filed on May 1, 2009, now Pat. No. 8,112,376, application No.

(Continued)

(30) Foreign Application Priority Data

Oct. 26, 2005 (IL) .......................................... 171577
Jan. 29, 2006 (IL) .......................................... 173409
Aug. 21, 2007 (IL) .......................................... 185414

(51) Int. Cl.
*G06N 5/00* (2006.01)
*G06F 1/00* (2006.01)
*H04N 7/173* (2011.01)
*H04H 20/10* (2008.01)

(Continued)

(52) U.S. Cl.
CPC ......... *H04N 7/17318* (2013.01); *H04H 20/103* (2013.01); *H04H 60/37* (2013.01); *H04H 60/56* (2013.01); *H04H 60/66* (2013.01); *H04N 21/25891* (2013.01); *H04N 21/2668* (2013.01); *H04N 21/466* (2013.01); *H04N 21/8106* (2013.01)

(58) Field of Classification Search
USPC ............................................ 725/46; 713/193
See application file for complete search history.

(56) References Cited

U.S. PATENT DOCUMENTS 6,122,628 A    9/2000  Castelli et al.
6,128,651 A   10/2000  Cezar (Continued)

FOREIGN PATENT DOCUMENTS

WO      02/31764      4/2002
WO   2007/0049282    5/2007

OTHER PUBLICATIONS

Barton, USPN 20060248558, Nov. 2, 2006, all pages, PDF version.*

(Continued)

*Primary Examiner* — Jeffrey A Gaffin
*Assistant Examiner* — Kalpana Bharadwaj
(74) *Attorney, Agent, or Firm* — M&B IP Analysts, LLC

(57) ABSTRACT

A method for matching an advertisement item to a multimedia content element. The method comprises extracting at least one multimedia content element from a web-page requested for display on a user node; generating a signature of the at least one multimedia content element; searching for at least one advertisement item respective of the signature; and causing the display of the at least one advertisement item within a display area of the web-page.

14 Claims, 4 Drawing Sheets

Related U.S. Application Data

13/624,397, which is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, application No. 13/624,397, which is a continuation-in-part of application No. 12/084,150, filed as application No. PCT/IL2006/001235 on Oct. 26, 2006, now Pat. No. 8,655,801.

(51) Int. Cl.
| | |
|---|---|
| *H04H 60/66* | (2008.01) |
| *H04N 21/258* | (2011.01) |
| *H04N 21/2668* | (2011.01) |
| *H04N 21/466* | (2011.01) |
| *H04N 21/81* | (2011.01) |
| *H04H 60/37* | (2008.01) |
| *H04H 60/56* | (2008.01) |

(56) References Cited

U.S. PATENT DOCUMENTS

| | | | |
|---|---|---|---|
| 6,243,375 B1 | 6/2001 | Speicher | |
| 6,381,656 B1 | 4/2002 | Shankman | |
| 6,611,628 B1 | 8/2003 | Sekiguchi et al. | |
| 6,665,657 B1 | 12/2003 | Dibachi | |
| 6,751,613 B1 | 6/2004 | Lee et al. | |
| 6,754,435 B2 | 6/2004 | Kim | |
| 6,763,519 B1 | 7/2004 | McColl et al. | |
| 6,819,797 B1 | 11/2004 | Smith et al. | |
| 6,901,207 B1 | 5/2005 | Watkins | |
| 7,013,051 B2 | 3/2006 | Sekiguchi et al. | |
| 7,020,654 B1 | 3/2006 | Najmi | |
| 7,047,033 B2 | 5/2006 | Wyler | |
| 7,260,564 B1 | 8/2007 | Lynn et al. | |
| 7,302,117 B2 | 11/2007 | Sekiguchi et al. | |
| 7,313,805 B1 | 12/2007 | Rosin et al. | |
| 7,340,458 B2 | 3/2008 | Vaithilingam et al. | |
| 7,353,224 B2 | 4/2008 | Chen et al. | |
| 7,376,672 B2 | 5/2008 | Weare | |
| 7,376,722 B1 | 5/2008 | Sim et al. | |
| 7,433,895 B2 | 10/2008 | Li et al. | |
| 7,464,086 B2 | 12/2008 | Black et al. | |
| 7,536,417 B2 | 5/2009 | Walsh et al. | |
| 7,574,668 B2 | 8/2009 | Nunez et al. | |
| 7,660,737 B1 | 2/2010 | Lim et al. | |
| 7,694,318 B2 | 4/2010 | Eldering et al. | |
| 7,697,791 B1 | 4/2010 | Chan et al. | |
| 7,769,221 B1 | 8/2010 | Shakes et al. | |
| 7,788,132 B2 | 8/2010 | Desikan et al. | |
| 7,860,895 B1 | 12/2010 | Scofield et al. | |
| 7,904,503 B2 | 3/2011 | Van De Sluis | |
| 7,920,894 B2 | 4/2011 | Wyler | |
| 7,921,107 B2 | 4/2011 | Chang et al. | |
| 7,974,994 B2 | 7/2011 | Li et al. | |
| 7,987,194 B1 | 7/2011 | Walker et al. | |
| 7,991,715 B2 | 8/2011 | Schiff et al. | |
| 8,000,655 B2 | 8/2011 | Wang et al. | |
| 8,266,185 B2 | 9/2012 | Raichelgauz et al. | |
| 8,312,031 B2 | 11/2012 | Raichelgauz et al. | |
| 8,316,005 B2 | 11/2012 | Moore | |
| 8,868,619 B2 | 10/2014 | Raichelgauz et al. | |
| 9,031,999 B2 | 5/2015 | Raichelgauz et al. | |
| 2002/0107827 A1 | 8/2002 | Benitez-Jimenez et al. | |
| 2002/0123928 A1* | 9/2002 | Eldering et al. | 705/14 |
| 2003/0041047 A1 | 2/2003 | Chang et al. | |
| 2004/0111465 A1 | 6/2004 | Chuang et al. | |
| 2004/0128511 A1 | 7/2004 | Sun et al. | |
| 2004/0153426 A1 | 8/2004 | Nugent | |
| 2005/0177372 A1 | 8/2005 | Wang et al. | |
| 2006/0031216 A1 | 2/2006 | Semple et al. | |
| 2006/0153296 A1 | 7/2006 | Deng | |
| 2006/0236343 A1 | 10/2006 | Chang | |
| 2006/0242139 A1 | 10/2006 | Butterfield et al. | |
| 2006/0242554 A1 | 10/2006 | Gerace et al. | |
| 2006/0248558 A1* | 11/2006 | Barton et al. | 725/46 |
| 2006/0253423 A1 | 11/2006 | McLane et al. | |
| 2007/0074147 A1 | 3/2007 | Wold | |
| 2007/0130159 A1 | 6/2007 | Gulli et al. | |
| 2007/0195987 A1 | 8/2007 | Rhoads | |
| 2007/0244902 A1 | 10/2007 | Seide et al. | |
| 2007/0253594 A1 | 11/2007 | Lu et al. | |
| 2007/0294295 A1 | 12/2007 | Finkelstein et al. | |
| 2008/0040277 A1 | 2/2008 | DeWitt | |
| 2008/0049629 A1 | 2/2008 | Morrill | |
| 2008/0072256 A1 | 3/2008 | Boicey et al. | |
| 2008/0201299 A1 | 8/2008 | Lehikoinen et al. | |
| 2008/0201314 A1 | 8/2008 | Smith et al. | |
| 2008/0313140 A1 | 12/2008 | Pereira et al. | |
| 2009/0089587 A1 | 4/2009 | Brunk et al. | |
| 2009/0125529 A1 | 5/2009 | Vydiswaran et al. | |
| 2009/0148045 A1 | 6/2009 | Lee et al. | |
| 2009/0175538 A1 | 7/2009 | Bronstein et al. | |
| 2009/0204511 A1 | 8/2009 | Tsang | |
| 2009/0216639 A1 | 8/2009 | Kapczynski et al. | |
| 2009/0245603 A1 | 10/2009 | Koruga et al. | |
| 2010/0023400 A1 | 1/2010 | Dewitt | |
| 2010/0082684 A1 | 4/2010 | Churchill et al. | |
| 2010/0088321 A1 | 4/2010 | Solomon et al. | |
| 2010/0104184 A1 | 4/2010 | Bronstein et al. | |
| 2010/0106857 A1 | 4/2010 | Wyler | |
| 2010/0191567 A1 | 7/2010 | Lee et al. | |
| 2010/0268524 A1 | 10/2010 | Nath et al. | |
| 2010/0318493 A1 | 12/2010 | Wessling | |
| 2011/0035289 A1 | 2/2011 | King et al. | |
| 2011/0106782 A1 | 5/2011 | Ke et al. | |
| 2011/0145068 A1 | 6/2011 | King et al. | |
| 2011/0202848 A1 | 8/2011 | Ismalon | |
| 2011/0208822 A1 | 8/2011 | Rathod | |
| 2011/0251896 A1 | 10/2011 | Impollonia et al. | |
| 2011/0313856 A1 | 12/2011 | Cohen et al. | |
| 2012/0167133 A1 | 6/2012 | Carroll et al. | |
| 2012/0330869 A1 | 12/2012 | Durham | |
| 2013/0332951 A1 | 12/2013 | Gharaat et al. | |

OTHER PUBLICATIONS

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Cernansky et al., "Feed-forward Echo State Networks"; Proceedings of International Joint Conference on Neural Networks, Montreal, Canada, Jul. 31-Aug. 4, 2005.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Freisleben et al., "Recognition of Fractal Images Using a Neural Network", Lecture Notes in Computer Science, 1993, vol. 6861, 1993, pp. 631-637.

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

(56) References Cited

OTHER PUBLICATIONS

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.
Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.
IPO Examination Report under Section 18(3) for corresponding UK application No. GB1001219.3, dated May 30, 2012.
IPO Examination Report under Section 18(3) for corresponding UK application No. GB1001219.3, dated Sep. 12, 2011.
Lin, C.; Chang, S.: "Generating Robust Digital Signature for Image/Video Authentication", Multimedia and Security Workshop at ACM Mutlimedia '98; Bristol, U.K., Sep. 1998; pp. 49-54.
Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Maass, W. et al.: "Computational Models for Generic Cortical Microcircuits", Institute for Theoretical Computer Science, Technische Universitaet Graz, Graz, Austria, published Jun. 10, 2003.
International Search Report for the corresponding International Patent Application PCT/IL2006/001235; Date of Mailing: Nov. 2, 2008.
Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin / Heidelberg ISSN: 1611-3349 ISBN: 978-3-540-26208-4.
Jaeger, H.: "The "echo state" approach to analysing and training recurrent neural networks", GMD Report, No. 148, 2001, pp. 1-43, XP002466251. German National Research Center for Information Technology.
Verstraeten et al.: "Isolated word recognition with the Liquid State Machine: a case study", Information Processing Letters, Amsterdam, NL, vol. 95, No. 6, Sep. 30, 2005, pp. 521-528, XP005028093 ISSN: 0020-0190.
Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.
Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
International Search Authority: "Written Opinion of the International Searching Authority" (PCT Rule 43bis.1) including International Search Report for International Patent Application No. PCT/US2008/073852; Date of Mailing: Jan. 28, 2009.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; Date of Issuance: Jul. 28, 2009.
Foote, Jonathan, et al. "Content-Based Retrieval of Music and Audio", 1997 Institute of Systems Science, National University of Singapore, Singapore (Abstract).
Ribert et al. "An Incremental Hierarchical Clustering", Visicon Interface 1999, pp. 586-591.

\* cited by examiner

SYSTEM AND METHODS THEREOF FOR VISUAL ANALYSIS OF AN IMAGE ON A WEB-PAGE AND MATCHING AN ADVERTISEMENT THERETO

CROSS-REFERENCE TO RELATED APPLICATIONS

This application is a continuation-in-part (CIP) of:
(a) U.S. patent application Ser. No. 13/344,400 filed on Jan. 5, 2012, which is a continuation of U.S. patent application Ser. No. 12/434,221, filed May 1, 2009, now U.S. Pat. No. 8,112,376;
(b) U.S. patent application Ser. No. 12/195,863, filed Aug. 21, 2008, now allowed, which claims priority under 35 USC 119 from Israeli Application No. 185414, filed on Aug. 21, 2007, and which is also a continuation-in-part of the below referenced U.S. patent application Ser. No. 12/084,150; and,
(c) U.S. patent application Ser. No. 12/084,150 filed on Apr. 25, 2008, now pending, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006.

All of the applications referenced above are herein incorporated by reference for all that they contain.

TECHNICAL FIELD

The present invention relates generally to the analysis of multimedia content, and more specifically to a system for matching a relevant advertisement to the analyzed multimedia content to be displayed as part of a web-page on a user's display.

BACKGROUND

The Internet, also referred to as the worldwide web (WWW), has become a mass media where the content presentation is largely supported by paid advertisements that are added to the web-page content. Typically, advertisements are displayed using portions of code written in, for example, hyper-text mark-up language (HTML) or JavaScript that is inserted into, or otherwise called up by documents also written in HTML and which are sent to a user node for display. A web-page typically contains text and multimedia elements that are intended for display on the user's display device.

One of the most common types of advertisements on the Internet is in a form of a banner advertisement. Banner advertisements are generally images or animations that are displayed within a web-page. Other advertisements are simply inserted at various locations within the display area of the document. A typical web-page displayed today is cluttered with many advertisements, which frequently are irrelevant to the content being displayed, and as a result the user's attention is not given to them. Consequently, the advertising price of potentially valuable display area is low because its respective effectiveness is low.

It would therefore be advantageous to provide a solution that would overcome the deficiencies of the prior art by matching an advertisement to an already existing image.

SUMMARY

Certain embodiments disclosed herein include a method for matching an advertisement item to a multimedia content element. The method comprising extracting at least one multimedia content element from a web-page requested for display on a user node; generating a signature of the at least one multimedia content element; searching for at least one advertisement item respective of the signature; and causing the display of the at least one advertisement item within a display area of the web-page Certain embodiments disclosed herein further include a system for matching an advertisement item to a multimedia content element from at least a web-page. The system comprises an interface to a network for receiving the at least the web-page containing at least one multimedia content element; and a server for extracting the at least one multimedia content element from the web-page; searching for at least one advertisement item respective of its signature; and causing the display of the advertisement item within a display area of the web-page.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
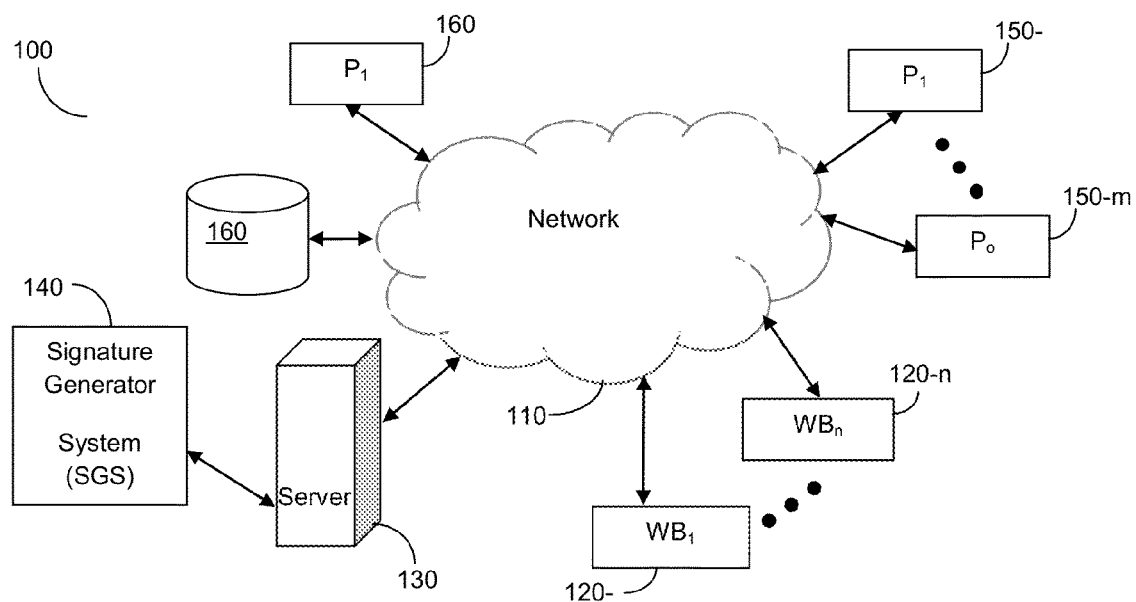
FIG. 1 is a schematic block diagram of a system for processing multimedia content displayed on a web-page according to an embodiment.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments disclosed herein allow matching at least an appropriate advertisement that is relevant to a multimedia content displayed on a web-page, and analyzing the multimedia content displayed on the web-page accordingly. Based on the analysis results, for one or more multimedia content elements included the web-page, one or more matching signatures are generated. The signatures are utilized to search for appropriate advertisement(s) to be displayed in the web-page. In one embodiment, in addition to the signatures, the advertisements can be searched and used in the web-page, based on extracted taxonomies, context, and/or the user preferences.

FIG. 1 shows an exemplary and non-limiting schematic diagram of a system 100 for providing advertisements for matching multimedia content displayed in a web-page in accordance one embodiment. A network 110 is used to communicate between different parts of the system. The network 110 may be the Internet, the world-wide-web (WWW), a local area network (LAN), a wide area network (WAN), a metro area network (MAN), and other networks capable of enabling communication between the elements of the system 100.

Further connected to the network 110 are one or more client applications, such as web browsers (WB) 120-1 through 120-n (collectively referred hereinafter as web browsers 120 or individually as a web browser 120, merely for simplicity purposes). A web browser 120 is executed over a computing device including, for example, personal computers (PCs), personal digital assistants (PDAs), mobile phones, a tablet computer, and other kinds of wired and mobile appliances, equipped with browsing, viewing, listening, filtering, and managing capabilities etc., that are enabled as further discussed herein below.

A server 130 is further connected to the network 110 and may provide to a web browser 120 web-pages containing multimedia content, or references therein, such that upon request by a web browser, such multimedia content is provided to the web browser 120. The system 100 also includes a signature generator system (SGS) 140. In one embodiment, the SGS 140 is connected to the server 130. The server 130 is enabled to receive and serve multimedia content and causes the SGS 140 to generate a signature respective of the multimedia content. The process for generating the signatures for multimedia content, is explained in more detail herein below with respect to FIGS. 3 and 4. The various elements of the system 100 as depicted in FIG. 1 are also described in the co-pending U.S. patent application Ser. No. 13/344,400 (hereinafter the '400 application) to Raichelgauz, et al., which is assigned to common assignee, and is incorporated hereby by reference for all that it contains. It should be noted that each of the server 130 and the SGS 140, typically comprises a processing unit, such as processor (not shown) that is coupled to a memory. The memory contains instructions that can be executed by the processing unit. The server 130 also includes an interface (not shown) to the network 110.

A plurality of publisher servers 150-1 through 150-m are also connected to the network 110, each of which is configured to generate and send online advertisements to the server 130. The publisher servers 150-1 through 150-m typically receive the advertised content from advertising agencies that set the advertising campaign. In one embodiment, the advertisements may be stored in a data warehouse 160 which is connected to the server 130 (either directly or through the network 110) for further use.

The system 100 may be configured to generate customized channels of multimedia content. Accordingly, a web browser 120 or a client channel manager application (not shown), available on either the server 130, on the web browser 120, or as an independent or plug-in application, may enable a user to create customized channels of multimedia content. Such customized channels of multimedia content are personalized content channels that are generated in response to selections made by a user of the web browser 120 or the client channel manager application. The system 100, and in particular the server 130 in conjunction with the SGS 140, determines which multimedia content is more suitable to be viewed, played or otherwise utilized by the user with respect to a given channel, based on the signatures of selected multimedia content. These channels may optionally be shared with other users, used and/or further developed cooperatively, and/or sold to other users or providers, and so on. The process for defining, generating and customizing the channels of multimedia content are described in greater detail in the co-pending '400 application referenced above.

According to the embodiments disclosed herein, a user visits a web-page using a web-browser 120. When the web-page is uploaded on the user's web-browser 120, a request is sent to the server 130 to analyze the multimedia content contained in the web-page. The request to analyze the multimedia content can be generated and sent by a script executed in the web-page, an agent installed in the web-browser, or by one of the publisher servers 150 when requested to upload on or more advertisements to the web-page. The request to analyze the multimedia content may include a URL of the web-page or a copy of the web-page. In one embodiment, the request may include multimedia content elements extracted from the web-page. A multimedia content element may include, for example, an image, a graphic, a video stream, a video clip, an audio stream, an audio clip, a video frame, a photograph, and an image of signals (e.g., spectrograms, phasograms, scalograms, etc.), and/or combinations thereof and portions thereof.

The server 130 analyzes the multimedia content elements in the web-page to detect one or matching advertisements for the multimedia content elements. It should be noted that the server 130 may analyze all or a sub-set of the multimedia content elements contained in the web-page. It should be further noted that the number of matching advertisements that are provided in response for the analysis can be determined based on the number of advertisement banners that can be displayed on the web-page or pre-configured by a campaign manager. The SGS 140 generates for each multimedia content element provided by the server 130 at least one signature. The generated signature(s) may be robust to noise and distribution as discussed below. Then, using the generated signature(s) the server 130 searches the data warehouse 160 for a matching advertisement. For example, if the signature of an image indicates a "sea shore" then an advertisement for a swimsuit can be a potential matching advertisement.

It should be noted that using signatures for searching of advertisements ensures more accurate reorganization of multimedia content than, for example, when using metadata. For instance, in order to provide a matching advertisement for a sport car it may be desirable to locate a car of a particular model. However, in most cases the model of the car would not be part of the metadata associated with the multimedia content (image). Moreover, the car shown in an image may be at angles different from the angles of a specific photograph of the car that is available as a search item. The signature generated for that image would enable accurate recognition of the model of the car because the signatures generated for the multimedia content elements, according to the disclosed embodiments, allow for recognition and classification of multimedia elements, such as, content-tracking, video filtering, multimedia taxonomy generation, video fingerprinting, speech-to-text, audio classification, element recognition, video/image search and any other application requiring content-based signatures generation and matching for large content volumes such as, web and other large-scale databases.

In one embodiment, the signatures generated for more than one multimedia content element are clustered. The clustered signatures are used to search for a matching advertisement. The one or more selected matching advertisements are retrieved from the data warehouse 160 and uploaded to the web-page on the web browser 120 by means of one of the publisher servers 150.

Figure 2:
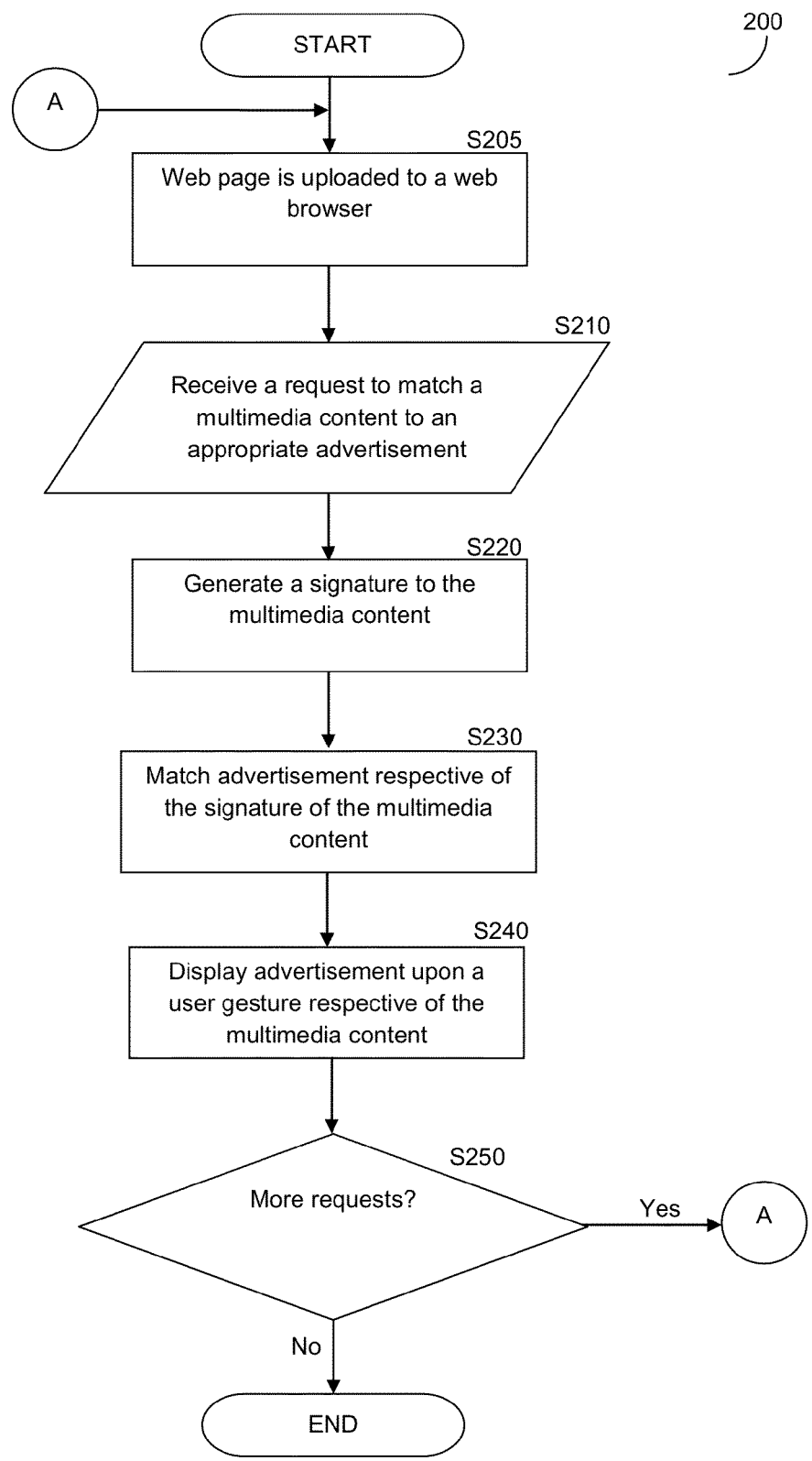
FIG. 2 is a flowchart describing the process of matching an advertisement to multimedia content displayed on a web-page according to an embodiment.

FIG. 2 depicts an exemplary and non-limiting flowchart 200 describing the process of matching an advertisement to multimedia content displayed on a web-page according to an embodiment. At S205, the method starts when a web-page is uploaded to one of the web-browsers (e.g., web-browser 120-

1). In S210, a request to match at least one multimedia content element contained in the uploaded web-page to an appropriate advertisement item is received. The request can be received from a publisher server (e.g., a server 150-1), a script running on the uploaded web-page, or an agent (e.g., an add-on) installed in the web-browser. S210 can also include extracting the multimedia content elements for a signature that should be generated.

In S220, a signature to the multimedia content element is generated. The signature for the multimedia content element generated by a signature generator is described below. In S230, an advertisement item is matched to the multimedia content element respective of its generated signature. In one embodiment, the matching process includes searching for at least one advertisement item respective of the signature of the multimedia content and a display of the at least one advertisement item within the display area of the web-page. In one embodiment, the matching of an advertisement to a multimedia content element can be performed by the computational cores that are part of a large scale matching discussed in detail below.

In S240, upon a user's gesture the advertisement item is uploaded to the web-page and displayed therein. The user's gesture may be: a scroll on the multimedia content element, a press on the multimedia content element, and/or a response to the multimedia content. This ensures that the user attention is given to the advertized content. In S250 it is checked whether there are additional requests to analyze multimedia content elements, and if so, execution continues with S210; otherwise, execution terminates.

As a non-limiting example, a user uploads a web-page that contains an image of a sea shore. The image is then analyzed and a signature is generated respective thereto. Respective of the image signature, an advertisement item (e.g., a banner) is matched to the image, for example, a swimsuit advertisement. Upon detection of a user's gesture, for example, a mouse scrolling over the sea shore image, the swimsuit ad is displayed.

The web-page may contain a number of multimedia content elements; however, in some instances only a few advertisement items may be displayed in the web-page. Accordingly, in one embodiment, the signatures generated for the multimedia content elements are clustered and the cluster of signatures is matched to one or more advertisement items.

Figure 3:
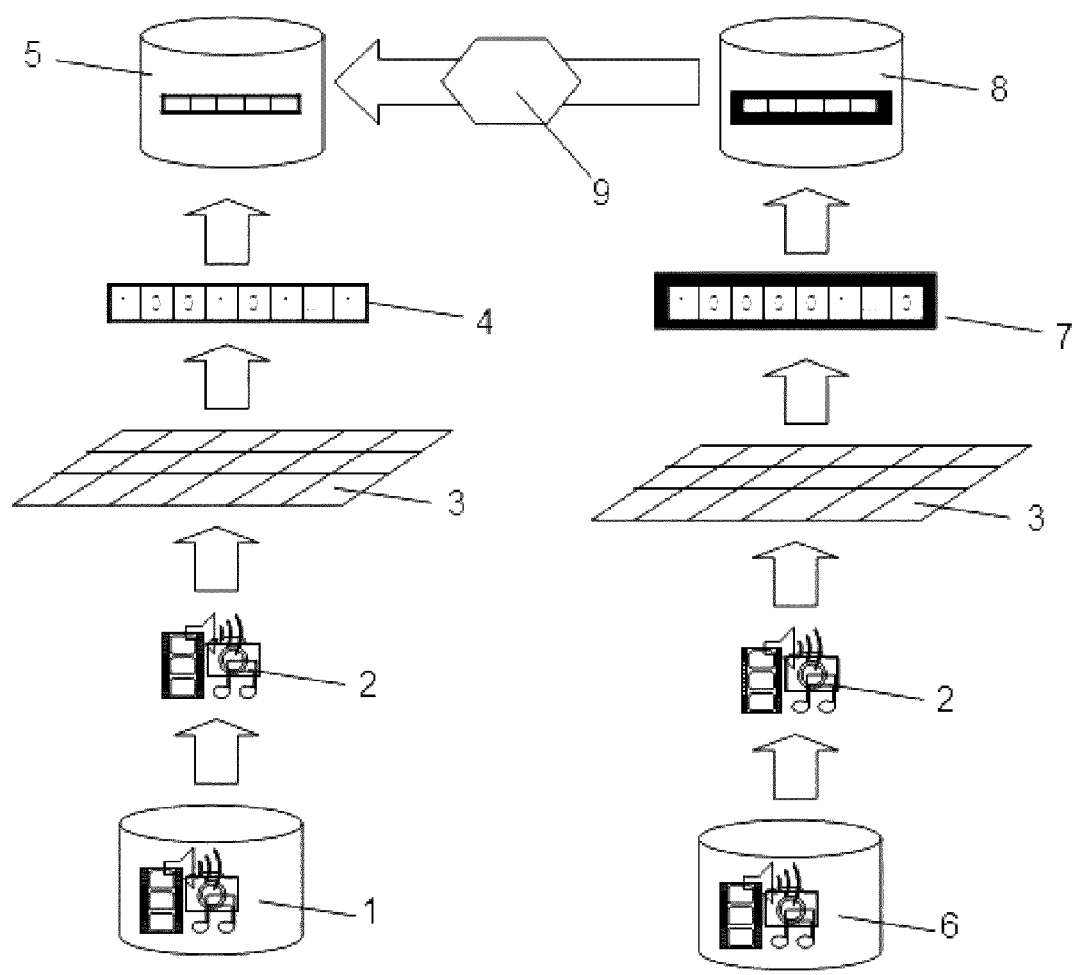
FIG. 3 is a block diagram depicting the basic flow of information in the signature generator system.
Figure 4:
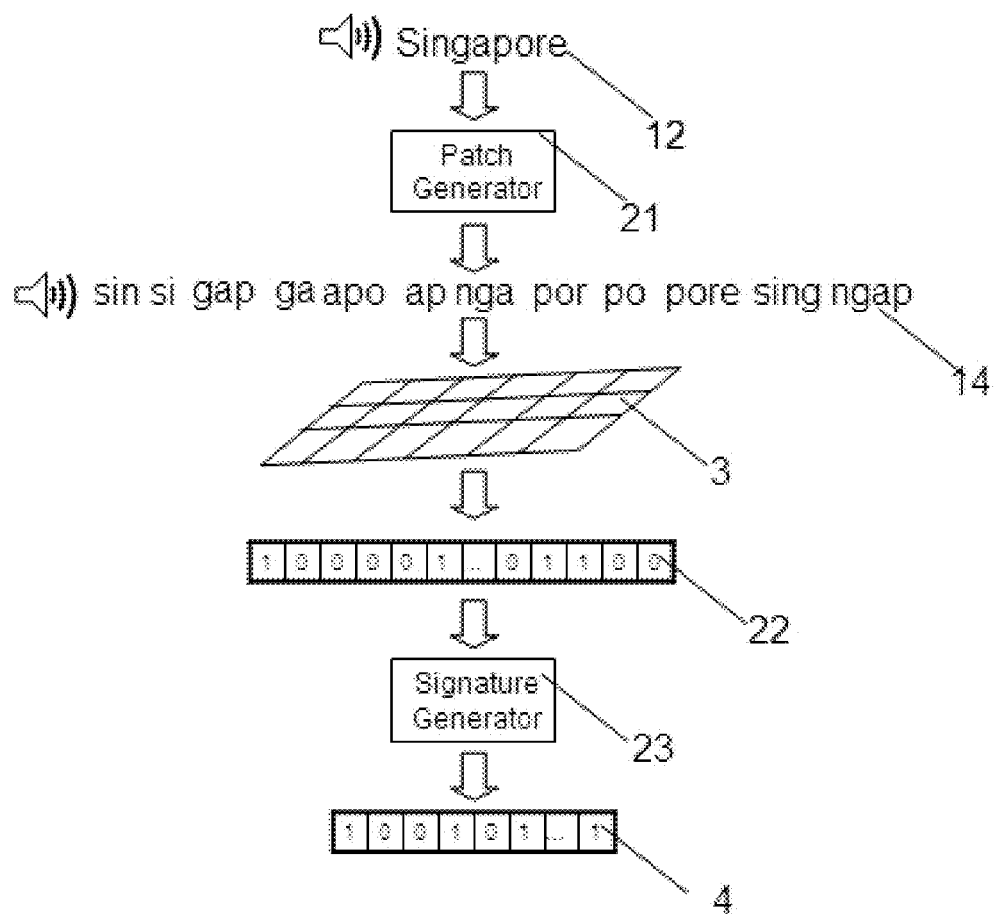
FIG. 4 is a diagram showing the flow of patches generation, response vector generation, and signature generation in a large-scale speech-to-text system.

FIGS. 3 and 4 illustrate the generation of signatures for the multimedia content elements by the SGS 140 according to one embodiment. An exemplary high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process will now be described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_{ij}\}$ ($1 \le i \le L$) may consist of a single leaky integrate-to-threshold unit (LTU) node or more nodes. The node $n_i$ equations are:

$$V_i = \sum_j w_{ij} k_j$$

$$n_i = \Box(Vi - Th_x)$$

where, $\Box$ is a Heaviside step function; $w_{ij}$ is a coupling node unit (CNU) between node i and image component j (for example, grayscale value of a certain pixel j); $k_j$ is an image component 'j' (for example, grayscale value of a certain pixel j); Thx is a constant Threshold value, where x is 'S' for Signature and 'RS' for Robust Signature; and Vi is a Coupling Node Value.

The Threshold values Thx are set differently for Signature generation and for Robust Signature generation. For example, for a certain distribution of Vi values (for the set of nodes), the thresholds for Signature (ThS) and Robust Signature (Th$_{RS}$) are set apart, after optimization, according to at least one or more of the following criteria:

1: For: $V_i > Th_{RS}$ $1-p(V > Th_S)-1-(1-\epsilon)^l \ll 1$ i.e., given that lnodes (cores) constitute a Robust Signature of a certain image l, the probability that not all of these l nodes will belong to the Signature of same, but noisy image, $\tilde{~}$ is sufficiently low (according to a system's specified accuracy).

2: $p(V_i > Th_{RS}) \approx l/L$, i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed.

Therefore, a signature can be used for the purpose of comparison to another signature without the need of comparison to the original data. The detailed description of the Signature generation is discussed in more detail in the co-pending patent applications of which this patent application is a continuation-in-part, and are hereby incorporated by reference.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for matching an advertisement item to a multimedia content element, comprising:
    extracting at least one multimedia content element from a web-page requested for display on a user node;
    generating, by a signature generator system, at least one a signature respective of the at least one multimedia content element;
    searching for at least one advertisement that matches the at least one multimedia content element, wherein the search is performed using the at least one generated signature, and wherein a signature of at least one matching advertisement matches the at least one generated signature; and
    causing the display of the at least one advertisement item within a display area of the web-page.

2. The method of claim 1, wherein the at least one advertisement is displayed respective of the web-page when a gesture of a user is detected by the user node.

3. The method of claim 2, wherein the user gesture is any one of: a scroll on the media content, a press on the media content, a response to the media content.

4. The method of claim 1, further comprising:
    clustering signatures generated for each of the at least one multimedia content element; and
    searching for at least one advertisement item matching the cluster of signatures.

5. The method of claim 1, wherein the multimedia content element is at least one of: an image, graphics, a video stream, a video clip, an audio stream, an audio clip, a video frame, a photograph, images of signals, combinations thereof, and portions thereof.

6. A non-transitory computer readable medium having stored thereon instructions for causing one or more processing units to execute the method according to claim 1.

7. A system for matching an advertisement item to a multimedia content element from at least a web-page, comprising:
    an interface to a network for receiving the at least the web-page containing at least one multimedia content element; and
    a processor; and
    a memory containing instructions that when executed configure the system to:
    generate at least one signature respective of the at least one multimedia content element;
    search for at least one advertisement item respective of its signature; and
    cause the display of the advertisement item within a display area of the web-page.

8. The system of claim 7, wherein the at least one signature is generated by a signature generator system, wherein the signature generator system further comprises:
    a plurality of computational cores enabled to receive the multimedia content element, each computational core of the plurality of computational cores having properties that are at least partly statistically independent of other of the computational cores, the properties are set independently of each other computational core.

9. The system of claim 8, further comprises:
    a database for maintaining advertisement items matching the generated signatures.

10. The system of claim 7, wherein the system is further configured to: display the at least one advertisement item in the web-page upon detection of a user's gesture.

11. The system of claim 10, wherein the user gesture is one of: a scroll on the multimedia content, a press on the multimedia content, a response to the multimedia content.

12. The system of claim 8, wherein the system is further configured to:
    cluster signatures generated for each of the at least one multimedia content element; and search for at least one advertisement item in the database matching the cluster of signatures.

13. The system of claim 7, wherein the multimedia content element is at least one of: an image, graphics, a video stream, a video clip, an audio stream, an audio clip, a video frame, a photograph, images of signals, combinations thereof, and portions thereof.

14. The method of claim 1, wherein the signature generator system further comprises: a plurality of computational cores enabled to receive the multimedia content element, each computational core of the plurality of computational cores having properties that are at least partly statistically independent of other of the computational cores, the properties are set independently of each other computational core.

* * * * *